J. M. FLANNERY.
BATTERY.
APPLICATION FILED MAY 3, 1916.
1,217,739.
Patented Feb. 27, 1917.
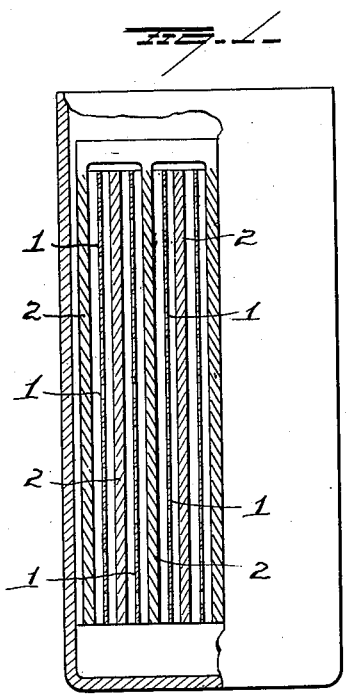
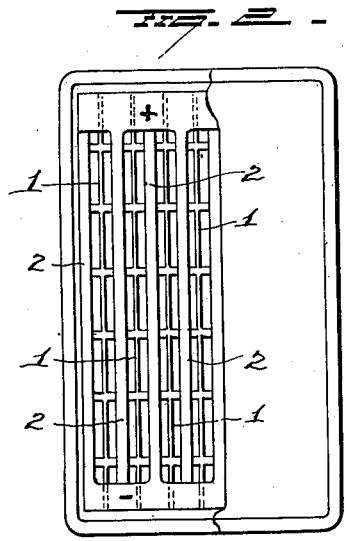
WITNESSES
E. L. Nottingham
G. F. Downing
INVENTOR
J. M. Flannery
By Seymour & Bright
Attorneys

UNITED STATES PATENT OFFICE.

JOSEPH M. FLANNERY, OF PITTSBURGH, PENNSYLVANIA.

BATTERY.

1,217,739.   Specification of Letters Patent.   Patented Feb. 27, 1917.

Application filed May 3, 1916. Serial No. 95,130.

*To all whom it may concern:*

Be it known that I, JOSEPH M. FLANNERY, a citizen of the United States, and a resident of Pittsburgh, in the county of Allegheny and State of Pennsylvania, have invented certain new and useful Improvements in Batteries; and I do hereby declare the following to be a full, clear, and exact description of the invention, such as will enable others skilled in the art to which it appertains to make and use the same.

This invention relates to improvements in batteries and is particularly applicable to storage batteries.

It has been found that important factors in the performance and life of an electric accumulator or storage battery, are the adequate circulation of the electrolyte, and extent of exposure of the surface of the active material to the electrolyte. These two conditions are often difficult to attain in practice owing to the limits of available space for the battery,—such for example, as in vehicles and submarines. On the other hand if the plates or electrodes be separated sufficiently to permit the most efficient circulation of the electrolyte and its contact with the greatest possible extent of surface of the active material, the internal resistance of the battery will be increased and the efficiency of the battery will be decreased in proportion to the distance apart which the plates may be disposed.

The object of my invention is to provide means whereby the plates of a storage battery may be sufficiently spaced apart to insure adequate circulation of the electrolyte and contact of the same with a maximum extent of surface of the active material of the plates, and at the same time afford such electrical conductivity through the electrolyte as will obviate excessive internal resistance which would otherwise occur when the plates are spaced apart more than is usually considered a maximum distance.

With this and other objects in view, the invention consists in certain novel features as hereinafter set forth and pointed out in the claims.

In the accompanying drawings; Figure 1 is a vertical sectional view partly in elevation illustrating a storage battery embodying my invention, and Fig. 2 is a horizontal sectional view partly in elevation.

I have found in practice that the conductivity of the electrolyte of a storage battery can be sufficiently enhanced when the plates are separated distances which will permit its free circulation and maximum contact with the active material of the plates, to compensate for internal resistance due to such wide separation of the plates, with the use of radio-active material so disposed with respect to the plates that the conductivity of the electrolyte is enhanced between said plates due to ionizing power of the radio-active material. Experiments have shown that while increase of separation of the battery plates will increase the internal resistance of the battery, still these experiments have also demonstrated the fact that such internal resistance is not only balanced and compensated for, but also that an increase of output per unit weight is obtained, with the presence of radio-active material between the plates.

In order to so locate and support the radio-active material that its ionizing power will most effectually reduce the resistance and enhance the conductivity of the electrolyte between comparatively widely separated plates and without unduly contracting the space between the plates, I prefer to employ very thin separators 1, immersed in the electrolyte between the plates 2—2 and spaced from the latter, so that the electrolyte may have unrestricted circulation and contact with the active material of the plates, and utilize these thin separators to support the radio-active material.

The body portions of the separators are provided with numerous perforations and may be made of any suitable material which can be made in thin sheets, and preferably such as will be of a waterproof character or insoluble in the sulfuric acid electrolyte of the battery. Thus the body portions of the separators might be composed of celluloid, bakelite, mica, rubber, wood, glass, silica, enameled metals, pottery ware or cork. These body portions of the separators are coated with a substance containing radio-active material. The radio-active material may be and preferably will be composed of a salt of radium incorporated in material such as celluloid or other material of a more or less vitreous nature capable of solidifying, which will not be deteriorated by the electrolyte of the battery, and this compound of radio-active material and a carrier or vehicle therefor, may be applied as a coating on the body portion of the separator. The radio-active coating may be applied in any suitable manner. If desired, the body of the separator may be immersed into the material containing the radio-active substance, so as to receive a radio-active coating.

As an example of the radio-active material which may be incorporated into the celluloid or other body material on the separator may be mentioned, a salt of radium, which may be in the form of a soluble chlorid or bromid or an insoluble radium sulfate, and in such quantity that the separator shall carry from one-half micrograin to five micrograins of radium. It will be readily understood that if a soluble radium salt be incorporated into the material of the separator, such salt will be converted into insoluble sulfate when the separator is immersed in the sulfuric acid electrolyte of the battery.

The separators 1 are made radio-active as above described, and constitute radio-active exciters and ionizers immersed in the electrolyte of the battery. Such radio-active exciters and ionizers may if desired, be made in the form of envelops to contain the plates of the battery and thus surround the same if desired.

Various forms of radio-active material might be used in making the exciters or ionizers but I prefer to employ a salt of radium, which will be insoluble in the electrolyte of the battery.

I do not wish to limit myself to any specific spacing of the ionizing separators relatively to the battery plates, and may assemble them in the battery in the same manner in which wooden and rubber separators are disposed between the plates in storage batteries now in use.

Having fully described my invention what I claim as new and desire to secure by Letters-Patent, is:—

1. An ionizer for electric batteries comprising a body portion provided with a radio-active coating.

2. An ionizer for electric batteries comprising a body portion and a coating consisting of radio-active material and an insoluble vehicle therefor.

3. An ionizer for electric batteries, comprising a perforated sheet having a radio-active coating.

4. An ionizer for electric batteries comprising a perforated sheet, and an insoluble coating containing radio-active material.

5. An ionizer for electric batteries comprising a separator for the plates of the battery, said separator having perforations and provided with a radio-active coating.

6. An ionizer for electric batteries comprising a thin body portion, and a coating of self-hardening material containing radio-active material.

7. An ionizer for electric batteries, comprising a perforated separator for the plates of the battery, said separator having a coating consisting of celluloid having radio-active material incorporated therein.

8. The combination with the separated plates and electrolyte of a battery, of ionizing separators immersed in the electrolyte between the plates, each separator comprising a thin body having a radio-active coating.

In testimony whereof, I have signed this specification in the presence of two subscribing witnesses.

JOSEPH M. FLANNERY.

Witnesses:
 WM. GANLEY,
 MAX HARTENHEIM.